Patented Aug. 6, 1940

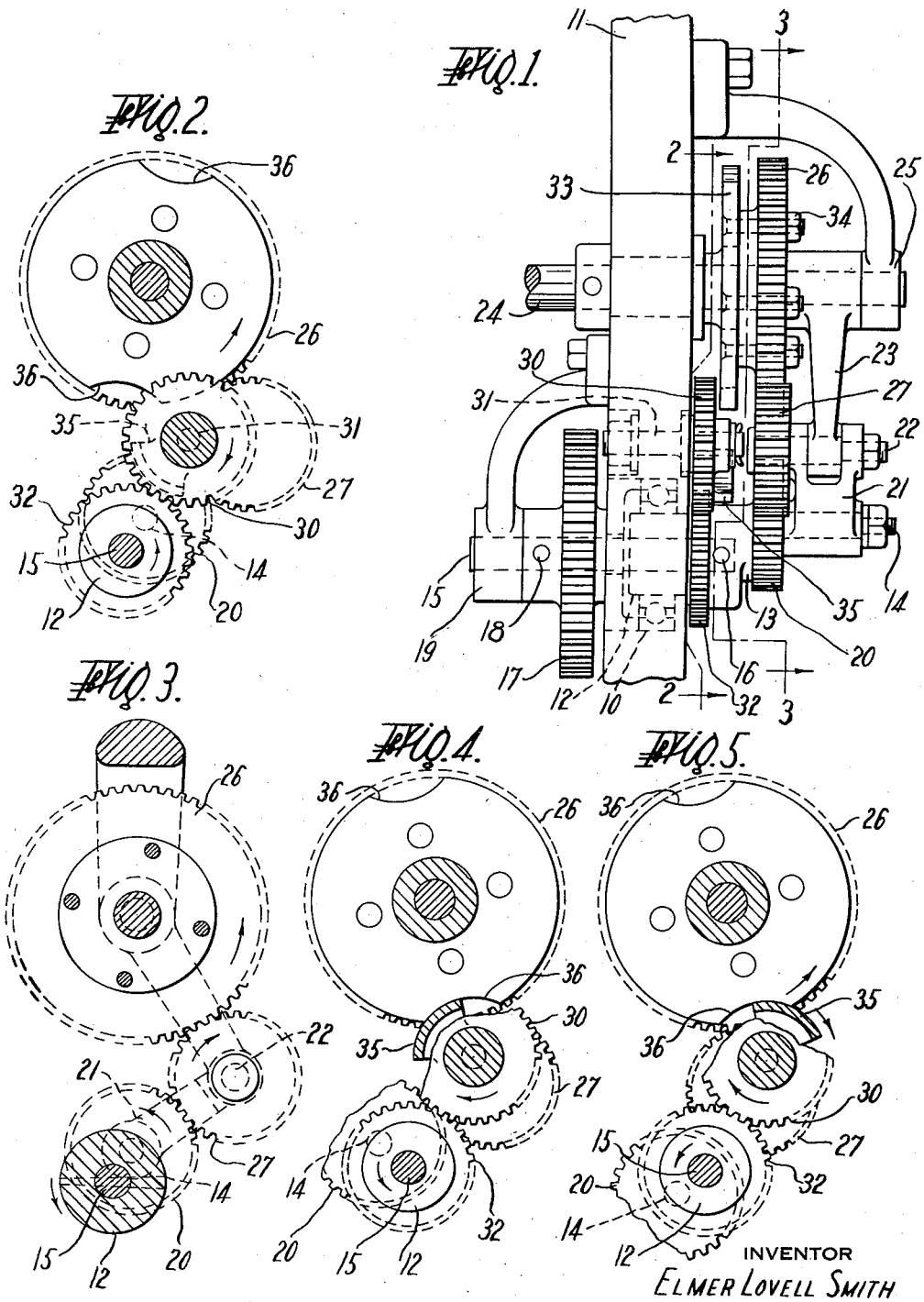

2,210,734

UNITED STATES PATENT OFFICE 2,210,734

INTERMITTENT DRIVE

Elmer Lovell Smith, Longmeadow, Mass., assignor to Package Machinery Company, Springfield, Mass., a corporation of Massachusetts Application April 4, 1939, Serial No. 265,890

3 Claims. (Cl. 74—394)

In the drive of intermittently rotating members such as the wrapping wheels or tumble boxes of wrapping machines it is desirable that the members should not only have intermittent rotatory motion but that they should be fixed against any possibility of motion during those periods in which they are intended to be stationary. On the older type of wrapping machine it was customary to secure the intermittent drive of the tumble boxes by means of the common Geneva movement, which normally accomplished both of these functions. There is a considerable shock to the starting and stopping of the Geneva movement which, while of little importance on slow speed machines, becomes of increasing moment when the speed is increased. Modern high speed gum wrapping machines, for example, must start and stop their tumble boxes at least one thousand cycles a minute, or from sixteen to twenty cycles a second. The stopping and starting of a driven rotary member such as a tumble box twenty times every second could not be accomplished in a practical manner by the ordinary Geneva movement, and it is the object of the present invention to provide a mechanism whereby this high rate of intermittent speed can be attained and the driven member at the same time be locked in a definite position for a definite time every time it stops.

The manner in which this is accomplished will best be understood from a consideration of the accompanying drawing, in which Fig. 1 is a side elevation of an intermittent drive embodying my invention;

Fig. 2 is a section on line 2—2 of Fig. 1;

Fig. 3 is a section on line 3—3 of Fig. 1; and

Figs. 4 and 5 are views generally corresponding to Fig. 2 but partially broken away to better illustrate the locking mechanism, Fig. 4 showing the condition of the mechanism at the beginning and Fig. 5 the condition at the end of the locked portion of the cycle.

Within an anti-friction bearing 10 supported in a frame 11 is journaled the hub 12 of a crank member 13 bearing a crank pin 14. A shaft 15 is pinned to the crank member at 16 and to the hub of a gear 17 at 18, and is supported by the hub 12 and by an outboard bearing 19. The gear 17 is driven continuously and steadily by any suitable source of power, and furnishes the rotation which it is the object of the present invention to convert into rapid intermittent motion. Upon the crank pin is fixed a gear 20, hereinafter referred to as the wobble gear on account of the bodily motion which it possesses due to its mounting eccentric to the hub 12 and to the shaft 15. Also fixed to the crank pin 14 is a link 21 coupled by a pin 22 to a radius link 23 freely swingable on the shaft 24, journaled in the frame and on an outboard bearing 25, to which it is desired to impart intermittent rotation and which may be considered as forming the driven member of the mechanism. A gear 26 is fixed upon the shaft 24 and an intermediate gear 27 is fixed upon the pin 22. The pin 22 is held at a fixed distance from the crank pin 14, upon which the gear 20 is mounted, by the link 21; and is held at a fixed distance from the shaft 24 by the radius link 23. If the intermediate gear 27 is of correct pitch diameter to engage the gears 20 and 26 in any one position of the wobble gear 20, it will continue to engage them in all positions of the wobble gear, on account of the action of the links mentioned.

It will be understood that as the shaft 15 rotates the wobble gear 20 is carried bodily around it, and since the wobble gear is fixed on its supporting pin it executes one revolution on its own axis at each revolution of the shaft. In the present case the intermediate gear is of the same size as that of the wobble gear, and executes two motions at each cycle. It will, in the first place, make one revolution on its own axis on account of being continually in mesh with the wobble gear; and in the second place it will move backward and forward on an arc about the driven shaft 24, the magnitude of the arc and hence the velocity of this motion depending on the eccentricity of the pin 14. As it moves in one way in this arc its rolling action on the gear 26 will increase the rapidity of motion of the latter, and when it rolls in the other direction the tendency to rotate the gear 26 which is due to the rotation of the intermediate gear on its own axis is counteracted by the fact that it is rolling backwards just as fast as it tends to turn. If the eccentricity of pin 14 is suitably chosen the forward movement of gear 26 given by rotation of gear 27 is just canceled or slightly exceeded, at one point in the cycle, by the bodily movement of the latter gear. During this period of the cycle, therefore, no rotation (or only an almost negligible reversal or rotation) is given to the driven shaft.

This type of wobble gear motion has been utilized previously in various forms, generally to produce a variable motion of the driven shaft somewhat analogous to that usually secured by elliptical gears. By a suitable choice of gear sizes (which is reflected in the lengths of the link and arm determining the center of the intermediate gear) it is possible to have the driven shaft driven intermittently, rotating through about 270° of the rotation of shaft 15 and remaining approximately at rest during the remaining time. In one example the pitch diameters of gears 20 and 27 are 2.75 inches, the pitch diameter of gear 26 is 5.50 inches, the distance between the centers of shafts 15 and 24 is 5.774 inches, and the distance between the centers of shaft 15 and pin 14 is 0.802 inch. The ratio of the radius of eccentricity to the radius of gear 20 is thus 0.802/1.37 or 0.586; and it may be mentioned that to cause a definite rest period this ratio should generally lie between 0.55 and 0.71 depending upon the length of dwell desired, which in this specific example is 280°. Although the driven shaft appears to remain at rest, the apparent stoppage with the proportions given involves an actual reversal of rotation which becomes greater in magnitude the greater the period of the cycle. At small magnitudes the reversal may be neglected, as it also may be for some uses where the exact positioning of the parts while at rest is not of importance. In driving the tumble box of a wrapping machine, however, it is of the utmost importance to have the article receiving slots of the tumble box in accurate registration with the article feeding channel by which articles are fed to these slots, and in accurate registration with the wrapping channel to which they are delivered, and also to have a period of rest long enough to permit the complete delivery of an article to the box and the delivery of another article from it while the accurate registration between the tumble box and the channel is maintained. At high speeds, moreover, the use of any locking mechanism, besides taking care of the reversal mentioned, must not be subject to high inertial forces.

Since the intermediate gear is rolling back and forth on the driven gear, and in fact is moving at top speed at the time when it is desired that the driven shaft should be stationary, it is impossible to use this gear or anything connected with it for locking the driven gear. In order to secure a good lock at high speeds the parts forming the lock must possess a motion of pure rotation as contrasted with a reciprocating motion. For this purpose, therefore, a pinion 30 mounted on a stub shaft 31 in the frame is in mesh with a pinion 32 mounted on the drive shaft 15. The gear 26 has a disk 33 attached to it by bolts 34, and the pinion 30 carries a segmental arm 35 having its outer surface shaped to correspond with arcuate recesses 36 in the circumference of the disk. It should be noted that whereas the intermediate gear 27 possesses a back and forth swinging motion which will be apparent from a comparison of the various figures of the drawing, the pinion 30 is mounted for rotation upon a stationary axis.

As the driven shaft is rotated the segmental arm 35 is rotating in synchronism with it, although at a constant speed, and as the driven shaft approaches its angular position of rest the arm introduces itself into one of the arcuate recesses, though initially out of contact with its walls. The arm for the first time contacts the wall of the recess when the parts reach the position of Fig. 4, where the leading edge of the segmental arm is on a line passing through the centers of the shafts 24 and 31. If the recess wall strikes the arm while the latter is in this position it will be apparent that the force of contact will be distributed throughout half the length of the recess, as is shown in Fig. 4, and therefore the shock incident to contact will be reduced; a result which is further assisted by the fact that the disk 33 is moving with practically zero speed at this point. The arm continues to rotate, and since the contact between its surface and the recess wall is now on both sides of the line joining the centers of the two shafts no motion of the disk in either direction will be permitted. As soon as the arm reaches the position of Fig. 5, however, the disk will be freed and can move away from the arm while the latter is turning towards a position outside the recess. The duration of the period of locking may be regulated by changing the arcuate length of the arm 35.

It has been mentioned above that the wobble gear mechanism does not give a true condition of rest, although if the eccentricity of pin 14 is chosen so as to give comparatively short rest periods the deviation is not generally unimportant. If the ratio of rest to motion is to be in the neighborhood of one to four, however, the deviation is material when accurate positioning is required. The locking mechanism being positive it is necessary to have some chance for variation between the continuous drive and the wobble gear mechanism. This can be accomplished by any well known form of yielding drive located as between the wobble gear and its pin and preferably operative only in a direction to permit reversal, in case the inertia of the driven parts is not high enough to cause trouble on the deceleration of the parts which would also affect the yielding connection. Preferably, however, a much simpler solution may be employed which avoids all trouble from inertial sources. This consists in making the gears forming the wobble gear train with a sufficient backlash to absorb the slight reversal when the driven gear is locked. It is unnecessary, and generally undesirable, to introduce backlash into the drive of the locking mechanism. In any event the amount of backlash permitted should be small, as the extent of reversal is only slight unless it is attempted to extend the period of dwell beyond reasonable limits.

As has been pointed out above, changes in the proportions of the various parts will produce variations in the motion, particularly as to the length of dwell and of course as to the relative speed between the driving and driven shafts. In the case shown the driven gear has been chosen of twice the pitch diameter of the wobble gear, and thus is caused to stop twice during each rotation. By changing the relative diameters of the gears any desired number of stoppages per rotation may be had. These and other mechanical changes are within the scope of the invention as pointed out in the accompanying claims.

I claim:

1. An intermittent rotating drive comprising a driven member, a locking member coupled to the driven member, a driving means for the driven member comprising a variable speed gear train having one of its terminal members constantly driven and the second of its terminal members connected to drive said driven member, said gear train being arranged to impart to said second terminal member a constantly variable angular velocity including a period of positive velocity in one direction and a period of negative velocity in the opposite direction, means for locking the locking member during the period of negative velocity comprising a continuously rotating locking device having locking engagement with the locking member, and means separate from the variable speed gear train for driving the rotating locking device, said variable speed gear train having sufficient inherent lost motion to permit the locking device to engage the locking member and positively hold the driven member stationary while the gear train is tending to impart a negative velocity to the second terminal member.

2. An intermittent rotating drive comprising a driven member, a locking disk coupled to the driven member, the locking disk being provided with at least one arcuate recess, a driving means for the driven member comprising a variable speed gear train having one of its terminal members constantly driven and the second of its terminal members connected to drive said driven member, said gear train being arranged to impart to said second terminal member a constantly variable angular velocity including a period of positive velocity in one direction and a period of negative velocity in the opposite direction, means for locking the locking disk during the period of negative velocity comprising a rotating segment formed to fit within the arcuate recess of the disk and means separate from the variable speed gear train for driving the rotating segment and in such timed relation to the locking disk that the forward edge of the segment reaches substantially the line joining the centers of rotation of the disk and the segment at the instant the driving means brings the second terminal member to a stop when going from the period of positive velocity to the period of negative velocity and the rear of the segment leaves said line at the instant that the driving means again begins to tend to impart positive velocity to the second terminal member, said variable speed gear train having sufficient inherent lost motion to permit the rotating segment to engage the locking disk while the variable speed gear train is tending to drive the second terminal member at a negative velocity to thereby positively hold the driven member stationary during the period of negative velocity.

3. An intermittent rotating drive comprising a driven member, a locking disk coupled to the driven member, the locking disk being provided with at least one arcuate recess, a continuously driven variable speed gear train in driving engagement with the driven member and comprising a driving shaft, a gear fixed eccentrically to said shaft, a gear in driving engagement with the driven member, an intermediate gear, and links holding the intermediate gear in constant engagement with both gears, the eccentricity of said first named gear being such as to give to the gear coupled to the driven member a constantly variable angular velocity including a period of positive velocity in one direction and a period of negative velocity in the opposite direction, a rotating segment formed to fit within the arcuate recesses of the disk and means for driving the rotating segment separately from the variable speed gear train and in such timed relation to the locking disk that the forward edge of the segment reaches substantially the line joining the centers of rotation of the disk and the segment at the instant the driving means brings the gear coupled to the driven member to a stop when said gear is going from the period of positive velocity to the period of negative velocity and the rear of the segment leaves said line at the instant that the last mentioned gear is going from the period of negative velocity to the period of positive velocity, said variable speed gear train having sufficient inherent lost motion to permit the rotating segment to engage the recess in the locking disk while the variable speed gear train is tending to drive the last mentioned gear at a negative velocity to thereby positively hold the driven member stationary.

ELMER LOVELL SMITH.